UNITED STATES PATENT OFFICE.

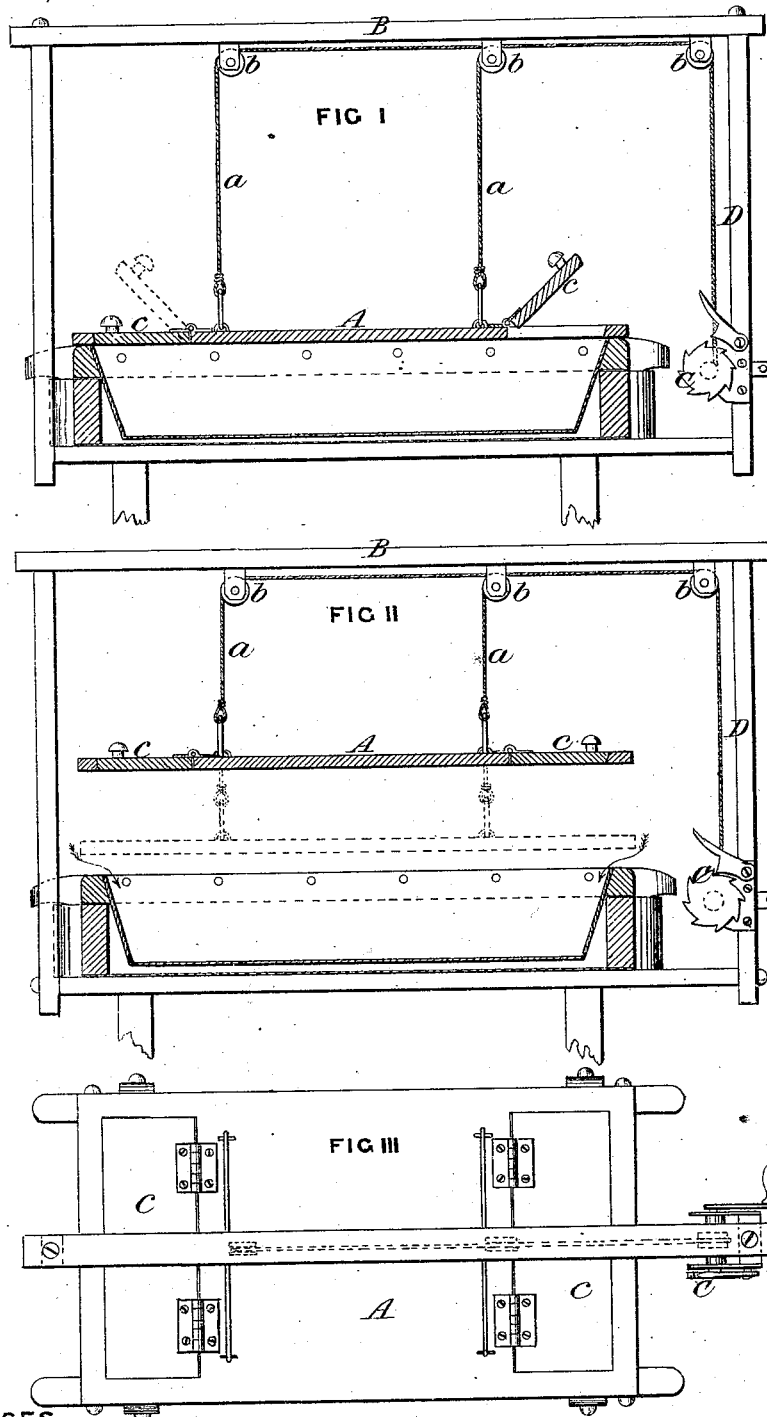

AUGUSTIN B. ARMSTRONG, OF DORSET, VERMONT.

IMPROVEMENT IN CHEESE-VATS.

Specification forming part of Letters Patent No. 162,003, dated April 13, 1875; application filed December 7, 1874.

*To all whom it may concern:*

Be it known that I, AUGUSTIN B. ARMSTRONG, of Dorset, in the county of Bennington and State of Vermont, have invented certain new and useful Improvements in Cheese-Vats; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The object of this invention is to provide a means for preserving the requisite temperature of the contents of the cheese-vat and to keep the top of the milk at the same temperature as the center of the mass.

To effect this object my said invention consists of a cover for the vat, made of wood, metal, or paper, and capable of being raised and lowered by means of controllable pulley-cords or other suitable means, and having supplemental doors for the purpose of examining the contents of the vat without the necessity of raising the cover until the proper moment arrives.

In the accompanying drawings, Figure 1 represents a longitudinal section of a cheese-vat provided with a cover in a closed position; Fig. 2, a similar view, showing the cover raised; and Fig. 3, a plan view thereof.

In order to a proper understanding of my invention, and its operation and effect, it is necessary to premise that a certain temperature in cheese-vats being always necessary, I provide a controllable cover to effect this object. Hitherto this has been attempted by the exercise of great skill and constant attention, and by numerous mechanical devices for regulating and controlling the power of the heating agent; but no cover has been used for the vat except a cloth laid upon sticks or poles. The purpose of my cover is to retain the heat in the milk vat or pan, and it is made controllable, so as to be raised and lowered vertically when required in the process of making cheese. The cover A is suspended by cords or chains $a$, passing over pulleys $b\ b\ b$, secured preferably to the ceiling B of the room, said cords being operated to raise, lower, and suspend the cover in a horizontal position by a ratchet-and-pawl windlass, C, attached to a post, D, or the wall of the room. The cover may thus be readily raised and lowered during the process, when desired. Two or more doors, $c$, are provided at each end of the cover for convenience in examining the mass without the necessity of raising the heavy cover.

Wood, metal, or paper, hardened and toughened after any approved process, may be used as the material for the cover A, and it may also be composed of a frame of sections, since I do not confine myself to any particular material or construction, except that the cover must be substantial and sufficiently heavy to seat itself tightly over the vat for the purpose of confining the heat and excluding the air of lower temperature in the make-room of the cheese-factory.

To illustrate the purpose and advantages of my invention, it may be necessary to state that the mass having been heated by any suitable means until it attains a temperature of 82°, the rennet is put in and the mass stirred thoroughly for five minutes or so, when the cover A is lowered down, and in about an hour the curd is hard enough to be cut with the curd-knife or spatula, the cover being necessarily raised during the cutting. The cover being down for an hour, the heating-agent is let on until 98° of heat is obtained. During this latter the cover has to be raised and the mass gently stirred while raising the temperature. The curd then lies in the whey, with the cover A down, for two to four hours, or until a certain degree of acidity is developed, when the whey is drawn off and the curd taken out, salted, hooped, pressed, &c., and in from twenty to forty days is ready for market.

The main object of the cover is to insure to the top of the milk, while coagulation is taking place, the same degree of heat as the center of the mass, thereby imparting a uniform degree of hardness to the curd, which is not the case where, without such cover, the top of the milk loses from 3° to 6°, the ordinary temperature of the make-room being from 50° to 70°. Another advantage is that, by using my cover down, after the curd is cut and until the last heating commences, the curd is held in its own whey with a uniform temperature. Experience teaches that the best cheese is produced, and in the quickest time, when the uniform 98° is kept up the proper time, and this is accomplished by the use of the cover. Another advantage is that my invention will absolutely prevent any loss of temperature for two hours after the final heating has taken place, and in three hours the loss will not exceed 1°, it being understood that the curd is not again heated after 98° has been obtained, but is allowed to stand in its own whey for, say, two to four hours, whereas without a cover, (or with the old stick and cloth cover,) and the temperature of the make-room at 60°, in three hours a loss of 10° will take place in the temperature of the mass, and the result is the changes work slower and a poor quality of cheese produced, an essential feature of my invention consisting in preserving the top of the milk, when heated to the proper degree for applying the rennet absolutely with the mass, until coagulation is sufficient for the mass to be cut. The effect upon the milk and curd first, by avoiding loss during coagulation, is that the coagulation is perfectly uniform and free from that soft and stringy appearance that results when a loss of 4° to 6° in temperature occurs on top of the milk when vats are, as usually, covered with a cloth.

By holding the mass until the ripening process is completed I obtain an absolutely even ripening, whereas, with the temperature of the make-room at 60°, as is the case during much of the season, the loss in temperature without my invention would, during the time I hold up the mass to 98°, be from 10° to 12°, which is a matter of vital importance in cheese-making. The employment of the controllable cover effects a saving of ten per cent. in fuel, and enables me to produce a better product and of increased yield.

The controllable cover is raised and lowered horizontally, and thereby affords access to all sides of the curd-vat for stirring, and during such operation it does not uncover entirely the whole surface of the curd, but rather husbands the heat above the surface of the curd, while exposing only the open sides above the cover, for the entrance of the cool air while manipulating the curd.

In the simple cloth cover heretofore used it required to be wholly removed, as well as the cross-poles on which it was supported, thus not only giving much trouble and taking much time, but exposing the whole surface of the curd-vat to the direct cooling action of the air. The supplemental doors are of great advantage in affording instant facility for examining the curd along the length of the vat without opening the main cover. When the process is completed the cover is elevated out of the way, and the vat is as free as if it had no cover.

Controlling the temperature of the milk is of such great advantage in the process of cheesemaking that even the least increase of facilities in this direction will be hailed by every person skilled in the art as an improvement of vital importance.

Whether the covers of boilers or other apparatus have been suspended from pulleys, and whether the lids of other vessels have been made sectional, are not questions applicable to the present case.

An invention has been made, and its claim to originality cannot be overthrown, except by reference to a previously-existing cheese-vat of like character.

I therefore claim—

A cheese-vat having a controllable cover, horizontal in all its positions, with sectional openings, substantially as herein described.

In testimony that I claim the foregoing as my own, I have affixed my signature in presence of two witnesses.

AUGUSTIN B. ARMSTRONG.

Witnesses:
CLARK J. WAIT,
JEROME H. COLLINS.